United States Patent [19]
Cheng

[11] Patent Number: 5,852,161
[45] Date of Patent: Dec. 22, 1998

[54] PROCESS FOR THE PREPARATION OF UNDOPED POLYANILINE VIA PARA-HALOANILINE

[75] Inventor: Brian K. Cheng, Chesterfield, Mo.

[73] Assignee: Monsanto Company, St. Louis, Mo.

[21] Appl. No.: 918,948

[22] Filed: Aug. 25, 1997

[51] Int. Cl.$^6$ .......................... C08G 73/00; C08F 283/00
[52] U.S. Cl. .......................... 528/228; 528/422; 525/540
[58] Field of Search ...................................... 528/422, 228; 525/540

[56] References Cited

U.S. PATENT DOCUMENTS

| | | | |
|---|---|---|---|
| 4,798,685 | 1/1989 | Yaniger | 528/422 |
| 4,940,517 | 7/1990 | Wei | 204/78 |
| 5,030,508 | 7/1991 | Kuhn et al. | 428/253 |
| 5,510,532 | 4/1996 | Rhee et al. | 564/288 |

FOREIGN PATENT DOCUMENTS 5051450  3/1993  Japan .

OTHER PUBLICATIONS

Novel Polyamines by the Polycondensation of Activated Aromatic Dihalo Compounds and Amines by Derek Brown. *Polymer Letters*, vol. 6, pp. 415–416 (1968).

Chemical Polymerization of 2–Chloroaniline and 2–Fluoroaniline by Chromic Acid by Dong–Pil Kang and Mun–Soo Yun. *Synthetic Metals*, vol. 29 (1989) E343–E348.

Synthesis and Properties of Electrically Conducting Polymers from Aromatic Amines by T. Hagiwara, T. Demura and K. Iwata. *Sythetic Metals*, vol. 18 (1987) 317–322.

Electronic Structure of Polyaniline and Substituted Derivatives by P. Snauwaert, R. Lazzaroni, J. Riga and J.J. Verbist. *Synthetic Metals*, vol. 18 (1987) 335–340.

Polymerization of Substituted Aniline and Characterization of the Polymers Obtained by Wang Shenlong, Wang Fosong and Ge Xiaohui. *Synthetic Metals*, vol. 16 (1986) 99–104.

Catalysis with Copper in the Ullman Reaction, by Paul E. Weston and Homer Adkins. vol. 50 pp. 859–866 Mar., 1928.

Synthesis of Poly($\underline{m}$–aniline) by Dehydrohalogenation of $\underline{m}$–Chloroaniline by Kazunari Yoshizawa, Kazuyoshi Tanaka, and Tokio Yamabe. *Chemistry Letters*, pp. 1311–1314 1990.

Synthesis and ESR Measurements of Polymeric Product of $\underline{m}$–Chloroaniline as an Approach to Magnetic Polymers by K. Tanaka, K. Yoshizawa, A. Takata and T. Yamabe. *Synthetic Metals*, 41–43 (1991) 3297–3300.

Dyestuffs Obtained by Linear Condensation. Part I. Polymerisation of p–Chloraniline and Allied Compounds by Rajindar Kumar Kochar and Sikhibhushan Dutt. *Joni. Indian Chem. Soc.*, vol. 30, No. 12, 1953 pp. 829–835.

Synthesis of polyaniline by use of the Ullmann reaction by Kazunari Yoshizawa, Akihiro Ito, Kazuyoshi Tanaka and Tokio Yamabe. *Synthetic Metals*, 48 (1992) 271–282.

Homopolycondensation of Aniline Halides: Synthesis of Polyaniline of the Regular Structure by A.M. Arzumanyan, A.A. Matnishyan, M.I. Fedorov, Sh.R. Melkonyan. *Vysokomolek Soedyneniya*, vol. (A) 33(4), 797–803 (1991).

*Primary Examiner*—P. Hampton-Hightower
*Attorney, Agent, or Firm*—Howell & Haferkamp, L.C.

[57] ABSTRACT

An improved method for the synthesis of low molecular weight polyaniline provides for heating a para-haloaniline in the presence of a high-boiling organic solvent and a vanadium catalyst. A neutral polyaniline can be synthesized by removing hydrogen halide as it is produced.

29 Claims, No Drawings

PROCESS FOR THE PREPARATION OF UNDOPED POLYANILINE VIA PARA-HALOANILINE

BACKGROUND OF THE INVENTION (1) Field of the Invention

The present invention relates to the synthesis of intrinsically conductive polymers and, more particularly to the synthesis of neutral, low molecular weight polyaniline.

(2) Description of the Related Art

Intrinsically conductive polymers such as polyaniline are promising materials for applications in corrosion resistant coatings, electrically conductive films and fibers, materials that absorb electromagnetic energy and the like. Thus far, the synthesis of polyaniline has been carried out mainly by oxidative polymerization of aniline monomers in acidic aqueous or mixed aqueous and organic solvents by using chemical oxidants (e.g., ammonium persulfate), or in electrochemical cells driven by imposition of an electrical potential. Genies et al., in *Synth. Metals,* 36:139–182, 1990, have reviewed methods for synthesizing polyaniline and properties of the resulting polymers.

Both chemical oxidation and electrochemical oxidation synthesis processes have disadvantages in producing a neutral polyaniline of low molecular weight cost effectively. Chemical oxidation processes require a chemical oxidant that is reduced during the polymerization to form a salt which must be separated from the polyaniline and either disposed of or recovered at additional cost. Electrochemical polymerization requires electrochemical cells which, at commercial scale, are expensive to construct and to maintain. And, both of these conventional techniques are carried out at relatively low concentration in water or mixed water and organic solvent systems, thereby yielding dilute product streams that require processing, recovery and treatment of large amounts of liquids per unit of product. Also, while oxidative polymerization is exothermic, it is desirable to run oxidative polymerizations at relatively low temperatures (e.g., 0°–20° C.) and so the processes require significant agitation and heat removal, which increase the cost of production. Information on chemical and electrochemical polymerization of polyaniline is found in, for example, U.S. Pat. No. 5,227,092; U.S. Pat. No. 5,006,278; U.S. Pat. No. 4,820,595; Lapkowski et al., 68:1597–1602, 1994; Yoshikawa et al., *J. Electroanal. Chem.,* 270:421–427, 1989; and U.S. Pat. No. 4,940,517.

Kuhn et al., in U.S. Pat. No. 5,030,508, reported the use of vanadium (V) compounds as oxidants in the oxidative polymerization of aniline. Sodium vanadate and vanadium pentoxide were used to polymerize aniline oxidatively in the presence of textile fibers. It was also stated that these vanadium compounds could be used in catalytic quantities along with such oxidants as ammonium peroxydisulfate. The resulting polyaniline was reported to be in the salt form and electrically conductive. These reactions, however, were carried out in aqueous solutions and the patent does not teach any use of vanadium compounds in non-oxidative polymerization, the use of these compounds to form neutral polyaniline, the use of vanadium (II) or vanadium (III) compounds, or the use of vanadium compounds in non-aqueous media. Aqueous synthesis processes are disadvantageous for several reasons such as, for example, they are limited to low temperature (below 100° C.) operation without provisions for pressure reactors and they are limited to relatively dilute solutions due to the low solubility of polyaniline in water.

Moreover, polyaniline that is produced by oxidative processes has disadvantages for some applications. For example, such oxidatively polymerized polyaniline is usually produced as the salt of the protonic acid that is used to facilitate the oxidative reaction. If neutral polyaniline is preferred, the polyaniline salt must be de-doped, thus requiring an additional processing step. (See, e.g., U.S. Pat. No. 5,441,772).

Some applications require neutral polyaniline within a controlled, low molecular weight range. For example, such polyaniline may be needed to insure solubility and anti-corrosion activity in paints, lubricants, coatings or other formulations. Nevertheless, it has been a priority to develop high molecular weight rather than low or moderate molecular weight polyaniline by oxidative polymerization and little emphasis has been placed on the development of neutral polyanilines having a degree of polymerization of from about 6 to about 40.

Efforts to solve some of these problems have provided several alternatives to the oxidative production of polyaniline. Work by Kochar, R. K. and S. Dutt (*J. Indian Chem. Soc.,* 30(12):829–835, 1953), disclosed the production of polyaniline from either pure para-chloroaniline or from p-chloroaniline with nitrobenzene as a solvent. In each case, activated metallic copper powder was employed as a catalyst and hydrogen chloride was removed by purging the reactor with a stream of dry nitrogen gas. When nitrobenzene was used, the reaction was carried out for 20 hours at 160°–170° C.; without nitrobenzene the heating maintained the reaction at 120° C. for the first hour and at 180°–200° C. for the next twelve hours. The molecular weight of the polyaniline product was reported to be about 750. No soluble catalysts were used in this work and no bases were used to neutralize hydrogen chloride.

More recently, Yoshizawa et al., *Chem. Letters,* 1311–1314, 1990, in an effort to produce a ferromagnetic polymer, synthesized reddish-orange poly-(m-aniline) by refluxing m-chloroaniline with copper (I) chloride under a nitrogen sweep to cause a catalytic dehydrochlorination between the amino group and chlorine in m-chloroaniline. After cooling, THF was added to dissolve oligomers and the solid polymer was collected by filtration. Further washing with ethanolic aqueous solution was required to remove the catalyst and to obtain the free amine form of the poly-(m-aniline). A degree of polymerization of about 7 was reported for the poly-(m-aniline), which would correspond to a weight- or number-average molecular weight of about 650 for the neutral polyaniline assuming a polydispersity of 1.0.

Later, Yoshizawa et al., *Synth. Metals,* 48:271–282, 1992, reported polyaniline synthesis via the Ullmann reaction, which is characterized by a copper-catalyzed reaction in a high boiling solvent causing nucleophilic substitution between aryl halides and aryl amines to form diarylamines and which uses a neutralizing agent, such as potassium carbonate, to neutralize the halogen acid that is formed. In this work, they report using only p-bromoaniline with copper (I) iodide as catalyst, nitrobenzene as a solvent and potassium carbonate as a base. Upon cooling, THF was added and filtered out to dissolve oligomers and unreacted materials. The product was then washed repeatedly with hot HCl to remove the catalyst and neutralizing agent followed by ammonia neutralization to obtain the polymer product which had a mean molecular weight of 3,466 (apparently a weight-average molecular weight). Yoshizawa et al., mention that p-halogenoaniline may be the starting material.

The preparation of polyaniline by polymerization of p-aminophenols is reported in Japanese Pat. No. JP 5051450

A. The reaction is catalyzed by zinc chloride and ammonium chloride and no solvent is used. The reaction is reported to have been carried out at a relatively low temperature of 100° C. and to have yielded a polymer having a number-average molecular weight of 9,500.

Arzymanyan et al., *Vysokomol. Soedin., Ser.A,* 33(4) :797–803, 1991, report the homopolymerization of haloanilines, p-chloroaniline, p-bromoaniline and p-iodoaniline, at 100°–250° C. to give HCl salts of polyaniline. Polymerization was reported to occur by an onium mechanism with nucleophilic substitution of halogen atoms and formation of polyhalogen hydrate salts. This method used no solvent and no catalyst, although it was mentioned that the catalytic use of copper would accelerate the reaction. The reactions were carried out in a sealed tube under 2 atm pressure of an inert gas and with no vapor or gas flow through the tube. The polyaniline HCl salts could be neutralized with potassium hydroxide, sodium methoxide or butyl lithium to obtain neutral polyaniline having a number-average molecular weight of about 3,170. No neutral polyaniline was produced in this work.

Despite the development of more efficient and lower cost alternatives to oxidative polymerization for the production of polyaniline, no method is now available to produce low molecular weight polyaniline in the molecular weight range of about 500 to about 4,000 that is neutral and is easily recoverable without extensive washing or extraction steps. Likewise, no method is available for the production of such polyaniline that makes efficient use of reactor volume and reactants by carrying out the polymerization in concentrated solutions. Also, no method is available for the production of such neutral, low molecular weight polyaniline without the use of a chemical oxidant or electrochemical cell. The availability of a method to produce such neutral, low molecular weight polyaniline efficiently would be of significant value for the commercial production of these compositions.

SUMMARY OF THE INVENTION

Briefly, therefore, the present invention is directed to a method for producing low molecular weight polyaniline comprising homopolymerizing a para-haloaniline at a temperature in excess of about 180° C. in the presence of a vanadium catalyst and a solvent, thereby polymerizing the para-haloaniline to produce low molecular weight polyaniline and a hydrogen halide. If a neutral, low molecular weight polyaniline is desired, the hydrogen halide can be removed or purged to produce a neutral, low molecular weight polyaniline.

Also provided is a method for producing low molecular weight neutral polyaniline comprising homopolymerizing para-chloroaniline at a temperature in excess of about 180° C. in the presence of a catalyst and a solvent, thereby polymerizing the para-chloroaniline to produce low molecular weight polyaniline and hydrogen chloride; and neutralizing the hydrogen chloride by contacting it with a separable base.

Among the several advantages found to be achieved by the present invention, therefore, may be noted the provision of a method for the production of a polyaniline having a low molecular weight range; the provision of a low molecular weight polyaniline that is undoped, or neutral; the provision of a method that produces such polyaniline that is easily recoverable without extensive washing or extraction steps; the provision of a method that makes efficient use of reactor volume and reactants by carrying out the polymerization in concentrated solutions; and the provision of a method of producing such polyaniline that requires no chemical oxidant or electrochemical cell.

DETAILED DESCRIPTION OF THE PREFERRED EMBODIMENTS

In accordance with the present invention, it has been discovered that easily recoverable neutral polyaniline having a low molecular weight can be produced by homopolymerization of a p-haloaniline at a temperature that is preferably at least 180° C., in a solvent having a boiling point between 180° C. and the boiling point of p-chloroaniline. It is also preferable that the solvent have a polarity that results in the synthesis of polyaniline having a desired, low range of molecular weight. The reaction can be catalyzed by catalytic amounts of compounds of vanadium (II) or vanadium (III) and the reaction is preferably carried out while excluding $O_2$ and removing hydrogen halide (halogen acid) as it forms with either an insoluble base that is easily recoverable, or by a vapor or inert gas sweep.

The sole reactant in the polymerization of the present invention is a p-haloaniline. The p-haloaniline may be any aniline that is halogenated at the para-position, but is preferably p-bromoaniline, p-iodoaniline or p-chloroaniline and is most preferably p-chloroaniline. Broadly, any commercial or laboratory grade p-haloaniline that may be unsubstituted or further substituted is suitable for use.

In general, substituted or unsubstituted p-haloanilines suitable for producing the low molecular weight polyaniline of this invention are of the formula:

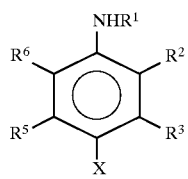

wherein:
X is chloro, bromo, or iodo;
$R^1$, $R^2$, $R^3$, $R^5$ and $R^6$ are the same or different and each is selected from hydrogen, alkyl, deuterium, alkenyl, alkoxy, cycloalkyl, cycloalkenyl, alkanoyl, alkythio, aryloxy, alkylthioalkyl, alkylaryl, arylalkyl, amino, alkylamino, dialkylamino, aryl, alkylsulfinyl, aryloxyalkyl, alkylsulfinylalkyl, alkoxyalkyl, alkylsulfonyl, arylthio, alkylsulfonylalkyl, sulfinate, arylsulfinyl, alkoxycarbonyl, arylsulfonyl, carboxylate, halogen, hydroxy, cyano, borate, sulfonate, phosphinate, phosphonate, nitro, alkylsilane or alkyl substituted with one or more phosphonate, carboxylate, borate, sulfonate, phosphinate, halo, nitro, cyano or epoxy moieties, or divalent organic moieties bonded to the same or a different substituted or unsubstituted aniline moiety, or aliphatic moieties having repeating units of the formula:

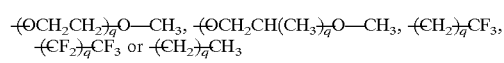

wherein q is a positive whole number; provided, however, that said polyaniline includes about 10 or more recurring substituted or unsubstituted aniline aromatic moieties in the polymer backbone.

The preferred p-haloaniline is unsubstituted p-haloaniline; that is, $R^1$, $R^2$, $R^3$, $R^5$, and $R^6$ are each hydrogen. More preferred p-haloanilines are unsubstituted p-chloroaniline or p-bromoaniline, and the most preferred p-haloaniline is unsubstituted p-chloroaniline.

A solvent is required for the present invention and serves as a medium for the nucleophilic substitution polymerization reaction. Solvents suitable for use in the subject reaction are organic solvents which do not participate as a reactant in the polymerization of the p-haloaniline. Preferred solvents have boiling points between about 180° C. and the boiling point of p- chloroaniline. The normal boiling point of p-chloroaniline is about 232° C. It is more preferable that the organic solvent have a boiling point between about 190° C. and about 220° C.

The organic solvent should also be one in which the p-haloaniline is soluble in an amount of at least about 5% wt/wt, and more preferably in an amount of at least about 20% wt/wt, and most preferably in an amount of at least about 50% wt/wt.

The inventor has found that the type of solvent used in the invention affects the molecular weight range of the polyaniline that is produced. When a polar organic solvent such as nitrobenzene (dielectric constant=36) is used, the number average molecular weight ($M_n$) of the polyaniline product falls roughly in the 1,000–4,000 range, while the use of a relatively non-polar solvent such as decahydronaphthalene (dielectric constant=2.2) as a solvent results in polyaniline having a number average molecular weight within a range of about 500–1,000. Thus, if it is desired to produce a polyaniline having a number average molecular weight within the upper part of the preferred molecular weight range, for example a number average molecular weight within a range of about 1,000 to about 4,000, it is preferred that the solvent have a dielectric constant of above about 15, more preferably above about 20 and most preferably above about 30. The most preferred solvent for producing polyaniline having a molecular weight within the upper part of the preferred molecular weight range is nitrobenzene. Conversely, if it is desired to produce a polyaniline having a number average molecular weight within the lower part of the preferred molecular weight range, for example a number average molecular weight range of about 500 to about 1,000, it is preferred that the solvent have a dielectric constant of below about 10, more preferably below about 6 and most preferably below about 4. The most preferred solvent for producing polyaniline having a molecular weight within the lower part of the preferred molecular weight range is decahydronaphthalene.

The catalyst for the subject reaction is preferably a metal or metal compound which has the ability to catalyze the nucleophilic substitution between the amine group of one p-haloaniline and the halo-substituent of a second p-haloaniline to yield the two moieties joined by an amine linkage and to catalyze the continuing addition of aniline monomers to the growing oligoaniline or polyaniline chain. The preferred catalyst can demonstrate this catalytic ability in the solvent of the present invention and at least in a temperature range of from about 180° C. to about 230° C.

Suitable catalysts for the present invention have been found to be certain, but not all, transition metals and certain transition metal compounds, such as transition metal salts. The use of copper metal and certain copper salts, in particular the copper chloride salts, as catalysts for the subject reaction is well known. Zinc and ammonium chloride have also been reportedly used as catalysts. (Japanese Pat. JP 5051450 (A)). But, it has also been reported that chlorides of calcium, iron, zinc, aluminum and tin were unsuitable as catalysts. (See, Kocher and Dutt, Id.). Surprisingly, however, the present inventor has found that certain salts of vanadium catalyze the reaction with superior results.

Preferred catalysts for this invention are divalent and trivalent salts of vanadium, more preferred are divalent and trivalent halide salts of vanadium. The most preferred catalysts for this invention are vanadium (II) chloride ($VCl_2$), and vanadium (III) chloride ($VCl_3$).

An advantage of vanadium compounds for use as catalysts in the subject reaction is their significantly higher solubility in water and other commonly used industrial solvents as compared to copper compounds. For example, the solubility of copper (I) chloride in cold water is only 0.062 g/l and it is insoluble in alcohols, while both vanadium (II) and vanadium (III) chloride are soluble in alcohols and are soluble, and decompose, in either cold or hot water. Therefore, a simple washing with water will remove residue of the preferred vanadium catalyst from the product polyaniline without the need of the extensive washing or extractions required to remove copper catalyst residues. See, for example, the purification procedure of Yoshizawa, *Synth. Metals*, 48, 271–282 (1992), where repeated washes with hot hydrochloric acid are used to remove the remaining copper chloride catalyst from the polyaniline.

Another advantage of vanadium over copper for use as a catalyst in this homopolymerization is that vanadium is more stable in the presence of oxygen than is copper, or at least the presence of oxygen is not nearly as deleterious to the vanadium catalyzed reaction as it is to the copper catalyzed reaction. This is important in commercial applications of the reaction because, whereas air must be rigorously excluded from copper-catalyzed reactions, some amount of oxygen is tolerated by the vanadium catalyst. This is believed to be due to the fact that the presence of oxygen causes the oxidation of copper from the cuprous to the cupric form, resulting in a significant reduction in catalytic ability. By contrast, both vanadium (II) and vanadium (III) work well as catalysts in the reaction. Thus, a conversion of V(II) to V(III) is not the serious problem that conversion of Cu(I) to Cu(II) is. The ability to run the reaction without an inert gas blanket would be a significant cost savings in commercial applications.

During homopolymerization of a p-haloaniline, one hydrogen halide is formed for each monomer added to the growing polymer chain. In order to prevent the accumulation of such hydrogen halides in the reaction solution, it is preferable that they be removed as they are formed during the reaction. Such removal is often done by the inclusion of a base, such as, for example, potassium carbonate, in the reaction mixture.

During polymerization of, for example, p-chloroaniline by nucleophilic substitution, the freed chloride anion can form a salt with the polyaniline by protonating the nitrogen of the amine linkage. At ambient temperature, such a salt is stable and a doped polyaniline is formed, but at the temperature of the subject reaction, the protonated amine will crack off the chloride producing free hydrogen chloride. In order to produce a neutral polyaniline from the reaction, it is preferred that the hydrogen chloride be removed from the reaction medium.

Typically, the free hydrogen halide is removed by the inclusion of a base such as potassium carbonate in the reaction medium to neutralize the acid as it is formed. While such a base is satisfactory for neutralizing the acid, there are disadvantages to the use of such bases. For example, the reaction between potassium carbonate and hydrogen chloride produces potassium chloride salt which is precipitated as a solid in the solvents of the present invention. In at least one embodiment of the present method the product polyaniline precipitates upon cooling and mixes with the precipitated potassium chloride. Usually, it is desirable to separate such salts from the polyaniline before its final use. This step often requires several additional washing or extraction steps. Alternative methods of removing the hydrogen halide that do not result in the formation of a salt having approximately the same physical form as the precipitated polyaniline are therefore advantageous. Two such methods are provided by the present invention.

One embodiment of hydrogen halide removal of the present invention involves operating the reaction at a sufficiently high temperature that the halide salt of polyaniline cracks, freeing the hydrogen halide. The hydrogen halide, after saturating the reaction solvent, evolves as a gas and is swept from the head-space of the reactor by flow of an inert gas such as nitrogen, or by the vapor from the boiling solvent. The hydrogen halide may then be easily scrubbed from the inert gas with water or other suitable absorbent chemical, or may be condensed from the inert gas and recovered. On the other hand, if the solvent is being refluxed, the hydrogen halide may be vented through the reflux condenser and recovered thereafter.

In this embodiment of hydrogen halide removal, it is preferred that the head space of the reactor be filled, or more preferred purged, with an inert gas while the subject reaction is being carried out at a temperature of at least 180° C., and even more preferably at a temperature of at least 200° C.; or, most preferably, at reflux at or above 200° C. (i.e., at or near the normal boiling point of a high-boiling organic solvent) with the organic solvent being condensed and returned to the reactor while the hydrogen halide is vented with the inert gas. An alternate to this embodiment is the operation of the reaction at reflux, but without the use of an inert gas. In this alternative, it is preferable that the hydrogen halide be condensed or otherwise removed from the gas stream exiting the condenser in order to prevent its buildup in the headspace of the reactor. When a vanadium compound is used as a catalyst in combination with removal of the hydrogen halide by venting at above 180° C., the resulting polyaniline is neutral and can be freed of the catalyst by a simple washing step.

Another embodiment of hydrogen halide removal involves the use of a base which can be easily separated from the polyaniline product, such as, for example, by remaining in a separate phase from the product polyaniline. Such base will be referred to herein as a separable base. The separable base is capable of binding or neutralizing a hydrogen halide as it is formed in the nucleophilic substitution reaction, but the separable base is substantially insoluble in the reaction mixture. The separable base is also of a chemical or physical nature sufficient to permit its easy separation from the polyaniline product without extensive washing or extraction. Such separable base may be of gaseous, liquid or solid form, but is preferably a solid material such as, for example, basic alumina, a molecular sieve, an ion-exchange resin, certain kaolin clays, or a polymer with basic functional groups such as, for example, amino groups. One such separable base that is more preferred for use in the present invention is basic alumina.

The polymerization reaction of the present invention proceeds by nucleophilic substitution between the aryl halide group and the aryl amine group of different p-haloaniline monomers. In general, the reaction of aryl halides with aryl amines in the presence of a high boiling solvent and with the use of copper as a catalyst is known as the Ullmann reaction (Ullmann, Ber., 36:2383, 1903; 37:853, 1904; 38:729, 1905). Its use for the reaction of phenyl bromide with N-acetyl-p-toluidine was reported by Weston and Adkins, J. Am. Chem. Soc., 50:859–866, 1928. This same chemistry may be used when the aryl halide and the aryl amine occur on the same molecule, e.g., p-haloaniline, with the resulting product being linkage of aniline monomers into polyaniline. (See, e.g., Green and Woodhead, J. Chem. Soc., 101:1117, 1912).

The method of producing the polyaniline will now be described. The reaction vessel should have wetted surfaces that are resistant to corrosion by any of the reactants or products. While glass is a suitable material for the reactor and attendant equipment, other materials, such as ceramic and certain temperature-resistant polymers and corrosion-resistant metals may also be suitable for use. The reaction vessel must be capable of operating at temperatures up to at least 232° C. at ambient, or very low, internal pressure. The vessel contents should be well agitated and the vessel should be capable of controlling the contents at a desired temperature. If a gaseous hydrogen halide is to be removed from the reaction by venting at over 180° C., it is preferable that the reaction vessel have provisions for the addition of an inert gas, such as nitrogen, to the head space during a reaction. It is also preferable that the vessel have a condenser capable of refluxing the solvent and, for commercial applications, have some provision for the condensation or other recovery or disposal of any HCl or other halogen acid vented out of the condenser during the reaction.

Initially, the reactants are mixed together in the reactor to form a mixture. The reaction mixture may be a solution, suspension, or dispersion. However, the agitation during reaction should be sufficiently vigorous to keep the mixture substantially homogeneous on at least a macroscopic scale.

Although other halo-anilines may be used, the amounts of other reactants will be described as molar ratios relative to p-chloroaniline unless otherwise noted, however, the same analysis may be applied to the other halo-anilines. The catalyst is added in a molar ratio to the p-cloroaniline of from about 0.001 to about 1.0, more preferably from about 0.005 to about 0.5 and most preferably from about 0.01 to about 0.1. The organic solvent is added in a molar ratio to the p-chloroaniline of from about 0.05 to about 30, more preferably from about 0.1 to about 10 and most preferably from about 0.5 to about 3.2. Optionally, about 1 mole of separable base, measured in terms of the active ingredient if a base like basic alumina is used, is added per mole of p-chloroaniline. In that embodiment where p-bromoaniline or p-iodoaniline is used, the amounts of other reactants will be based on the amount of the haloaniline used and will be added in ratios similar to those given for p-chloroaniline.

The reactants are mixed in the reactor by any conventional means. Since p-chloroaniline has a normal melting point of about 72° C., and p-bromoaniline has a normal melting point of about 66° C., either may be added to the reaction mixture as a solid. When the p-haloaniline, the organic solvent, the catalyst and the base, if desired, have been added to the reactor, the head space of the reactor is preferably swept of oxygen by the introduction of an inert gas such as nitrogen into the head space, cooling medium is admitted to the condenser and the reactor contents are heated to the desired reaction temperature. The reactor contents are agitated, or mixed, with any conventional method of agitation to a degree which maintains all reactants in a homogeneous suspension and promotes sufficient heat transfer. The agitation continues throughout the reaction period and may be continued through all or part of the cool-down period.

While the reaction mixture is being heated, the p-haloaniline melts and goes into solution with the organic solvent. While it is probably necessary that at least a small amount of the catalyst be in solution to catalyze the desired reaction, the amount which goes into solution is not critical and some catalyst may remain insoluble in the reaction mixture. If an insoluble solid separable base is being used, it remains as a solid throughout the reaction period.

As the reaction mixture nears the desired reaction temperature of from about 180° C. to the boiling point of the solvent, the desired reaction accelerates and the solvent becomes highly colored and opaque. As the reaction continues, hydrogen chloride or other hydrogen halide is cracked from the polyaniline salt and is either neutralized by the base in the reaction mixture, or freed into the head space of the reactor. The vapor from the boiling solvent, or the inert gas, if used, carries the HCl, HBr, or other hydrogen halide from the reactor and into the condenser. If an inert gas is used to sweep the head space, the acid gas is carried through the reflux condenser and may be condensed, scrubbed or otherwise recovered from the inert gas, if desired. If no inert gas is used to sweep the head space, the HCl, Hbr, or other hydrogen halide is preferably condensed or otherwise removed after the condenser in order to prevent its build-up in the reactor head space.

The reaction is allowed to continue for as long as desired, or until the reaction is complete. Often this can take from about 5 to about 20 hours and time of reaction is not critical as long as the reaction is allowed to go to the desired degree of completion.

When the desired time for reaction has elapsed, the reaction mixture is allowed to cool. If a polar solvent, such as nitrobenzene, has been used, the polyaniline remains in solution. A non-polar organic solvent such as hexane may be added to precipitate the polyaniline and the mixture permitted to stand for up to several hours for the precipitate to form. The solid polyaniline may then be removed from the reaction mixture by filtration, centrifugation, decanting, or any other solid-liquid separation method. If a less-polar solvent, such as decahydronaphthalene, has been used, the polyaniline will form a precipitate upon cooling of the mixture without addition of another solvent. The polyaniline solids may then be recovered and used as is, or may be dried prior to use.

If no base has been used during the reaction and substantially all halogen acid has been removed through the gas stream, no salt removal is necessary and polyaniline recovery by, for example, precipitation and filtration may continue.

If a separable base, such as basic alumina, has been used to neutralize the acid produced, it may be removed from the reaction mixture prior to precipitation of the polyaniline by, for example, screening or filtration. Recovery of the polyaniline may then proceed as described above. If desired, the alumina may be washed with a solvent such as ethyl acetate to remove any remaining polyaniline. If desired, some insoluble bases, such as basic alumina, can then be regenerated by processes that are well known in the art and reused.

The method of the present invention has several advantages over conventional chemical and electrochemical oxidative polymerization methods used to produce polyaniline. First, in the most preferred embodiments, the initial concentration of p-haloaniline in the reaction mixture can be up to about 70% by weight, or higher. This is much higher than the initial concentration of aniline in chemical or electrochemical oxidative polymerization methods. Since the yield of the product polyaniline often ranges up to about 70% of theoretical in the present invention, the concentration of the product is much higher than in oxidative polymerization methods and the productivity (measured as mass of product produced per unit of reactor volume per unit time) of the subject method is also higher. This results in the size and cost of reactors necessary to produce a given amount of polyaniline being much lower a for the subject method than for oxidative polymerization methods.

Furthermore, the reaction of the present invention is carried out at a much higher temperature (180° C.–230° C.) than oxidative polymerization reactions producing polyaniline (normally about 0° C.–20° C.). The advantages of such high-temperature operation are that the higher temperature accelerates the reaction, thus requiring less time to complete than oxidative polymerizations; it results in cracking the halide salt of polyaniline, thus freeing the halogen into the head space of the reactor where it can be removed without having to use a base and forming salts; and there is no need for cooling the reactor contents, thus allowing a more simple and less expensive reactor than oxidative polymerizations and requiring no costly cooling during operation.

The product of the present invention is a linear polymer of polyaniline having a low degree of polymerization. The number average molecular weight ($M_N$) of the product by GPC ranges from about 300 to about 8,000, more preferably from about 400 to about 6,000 and most preferably from about 500 to about 4,000. The preferred polyaniline is neutral and undoped and is electrically non-conductive. The product is insoluble in water, ethanol and hexane, slightly soluble in ethyl acetate and soluble in NMP.

The low molecular weight, neutral polyaniline that is produced by the present invention is useful in a number of applications. The material can serve as a precursor for doped polyanilines and can thereby be made electrically conductive. Such doping may be carried out by contacting the product with a protonic acid such as, for example, inorganic acids like hydrochloric acid, sulfuric acid, phosphoric acid and the like, or organic acids like para-toluene sulfonic acid, dodecylbenzene sulfonic acid, dinonylnaphthalene sulfonic acid, polystyrene sulfonic acid, and the like, and an oxidant, such as air, ammonium peroxidisulfate, potassium permanganate, potassium dichromate, chromium oxide, manganese dioxide, and the like.

The doped or neutral low molecular weight polyaniline may also be used as a component in corrosion resistant paints, films and coatings. U.S. Pat. No. 5,441,772 reports the advantages of neutral polyanilines in corrosion resistant coatings for metals and the use of doped polyaniline in such coatings is well known. The material is easily blended with other paint constituents and provides excellent corrosion resistant properties.

In addition, the polyaniline produced by the subject method may be used as an additive to polymers, polymer blends, films, fibers, or the like and may be used in any other application in which low molecular weight, doped or neutral polyanilines are normally used.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

COMPARATIVE EXAMPLE 1

Synthesis of polyaniline from p-chloroaniline using cuprous chloride and nitrobenzene in presence of potassium carbonate base.

Para-chloroaniline (13 g, 0.102 moles), cuprous (copper I) chloride (100 mg, 0.001 moles), and potassium carbonate (14 g, 0.101 moles) were added to nitrobenzene (5 ml, 0.049 moles) in a glass reaction flask with a stirring bar and blanketed with nitrogen. (Laboratory chemicals of standard grade are used herein unless otherwise noted.) The mixture was heated with constant stirring under a nitrogen blanket at 200° C. for 7 hours. After the solution cooled to ambient temperature, hexane (70 ml, 0.537 moles) was added and the solution allowed to stand for at least 2 hours for the precipitate to form. The color of the mother liquor was dark purple, indicating the presence of polyaniline. The contents of the flask were vacuum filtered and the solids retained on the filter were washed with water to remove salt. Polyaniline (3.5 g) was obtained as a dark purple solid after drying under vacuum.

The molecular weight parameters of the polyaniline polymer were determined by gel permeation chromatography (GPC) using a refractive index detector. For the procedure, two Ultrastyragel columns with mean permeabilities of $10^5$ Angstroms and $10^3$ Angstroms were used at a flow rate of 0.5 ml/min and at a controlled temperature of 45° C. N-methyl pyrolidone (NMP) solution containing 0.1% ammonium formate modifier was used as GPC eluent or solvent. The ammonium formate was added to minimize the binding of the polyaniline to the columns. The molecular weight of the polymer was measured by GPC. The GPC columns were calibrated by twelve polystyrene standards with molecular weights ranging from $1.1 \times 10^6$ to 3000 g/mole. (weight average molecular weight, $M_w$). The polyaniline solids recovered above showed number-average molecular weight ($M_n$)=990 and weight-average molecular weight ($M_w$)=1,310.

COMPARATIVE EXAMPLE 2

Synthesis of polyaniline from p-chloroaniline using cuprous chloride and nitrobenzene in presence of potassium carbonate base.

The reactants and reaction conditions of Example 1 were repeated except that the reaction was continued for a total of 16 hours of reaction time. Again, dark purple polyaniline solids (3.5 g) were recovered by filtration, washing and drying. The molecular weight of the solids was analyzed by GPC as described in Example 1, the results showed: $M_n$=1,000 and $M_w$=1,310. Again the mother liquor was dark purple, indicating the presence of polyaniline. The molecular weight of the polyaniline from comparative example 2 was almost the same as that from comparative example 1 despite the difference in reaction times.

COMPARATIVE EXAMPLE 3

Synthesis of polyaniline from p-chloroaniline using cuprous chloride and nitrobenzene with removal of hydrogen chloride by venting.

Para-chloroaniline (60 g, 0.47 moles) and cuprous (copper I) chloride (2 g, 0.0202 moles) were added to nitrobenzene (60 ml, 0.587 moles) in a glass reaction flask with a stirring bar. The reaction mixture was heated to 220° C. with constant stirring under a nitrogen blanket for 6 hours. After the solution cooled to about 50° C., hexane (200 ml, 1.53 moles) was added and the solution was allowed to stand for at least 2 hours at ambient temperature to precipitate the solids. The contents of the flask were vacuum filtered and the solids retained on the filter were washed with water at 100° C. to remove salt. Polyaniline (3.5 g) was obtained as a dark purple solid after drying under vacuum. The molecular weight of the solids was analyzed by GPC as described in comparative example 1, the results showed: $M_n$=2,920 and $M_w$=3,750. The product was found to be insoluble in water and hexane; slightly soluble in ethyl acetate; and soluble in 1-methyl-2-pyrrolidone.

COMPARATIVE EXAMPLE 4

Synthesis of polyaniline from p-chloroaniline using cuprous chloride and decahydronaphthalene in the presence of potassium carbonate base.

Para-chloroaniline (13 g, 0.102 moles), cuprous (copper I) chloride (200 mg, 0.001 moles) and potassium carbonate (14 g, 0.101 moles) were added to decahydronapthalene (50 ml, 0.324 moles) in a glass reaction flask with a stirring bar and reflux condenser. The mixture was heated at reflux with stirring under a nitrogen atmosphere for 6 hours. After cooling to ambient temperature, a solid precipitate of polyaniline solids had formed without the addition of a precipitant. When the contents of the flask were vacuum filtered, the color of the mother liquor was dark purple, indicating the presence of polyaniline. The solids were washed with hexane, followed by water, to remove salt. After drying under vacuum, polyaniline (7.0 g) was obtained as dark purple solids.

The molecular weight of the solids was analyzed by GPC as described in comparative example 1, the results showed the number average molecular weight to be between about 600 and 1,000.

EXAMPLE 1

Synthesis of polyaniline from p-chloroaniline using cuprous chloride and decahydronaphthalene in the presence of a separable base.

Para-chloroaniline (13 g, 0.102 moles), cuprous (copper I) chloride (1 g, 0.01 moles) and basic alumina (13 g) were added to decahydronaphthalene (10 ml, 0.065 moles) in a glass reaction flask with stirring bar and reflux condenser. The mixture was heated at reflux under a nitrogen atmosphere for 7 hours. After cooling to ambient temperature, ethyl acetate (70 ml, 0.71 moles) was added to solubilize the polyaniline and the solution was allowed to stand for at least an additional 2 hours at ambient temperature for the alumina solids to precipitate. The solution was vacuum filtered and the alumina solids were washed 5 times with ethyl acetate (100 ml portions) to remove remaining polyaniline. The ethyl acetate wash solution was added to the filtrate and the resulting solution was concentrated under vacuum. Hexane (100 ml, 0.766 moles) was added to the dark purple solution and the polyaniline allowed to precipitate. The solution was vacuum filtered and, after washing with water, polyaniline (3 g) was obtained after drying.

The molecular weight of the solids was analyzed by GPC as described in comparative example 1, the results showed $M_n$=600.

The color of the alumina was dark purple, indicating the presence of polyaniline adsorbed on the alumina. Further washing of the alumina with ethyl acetate gave more dark purple filtrate.

EXAMPLE 2

Synthesis of polyaniline from p-chloroaniline using vanadium (II) chloride in nitrobenzene in the absence of a base.

Para-chloroaniline (5 g, 0.039 moles) was mixed with vanadium (II) chloride (0.2 g, 0.0016 moles) in nitrobenzene (10 ml, 0.098 moles) and heated at reflux with stirring under a nitrogen atmosphere for 6 hours. The solution was allowed to cool to ambient temperature and hexane (50 ml, 0.38 moles) was added to precipitate the product. The solvent was removed by vacuum filtration and the retained solids were washed with hexane. Polyaniline (3.5 g) was obtained as a dark purple solid after drying under vacuum. GPC analysis of molecular weight showed: $M_n$=1,685 and $M_w$=3,535. The product was found to be insoluble in water and hexane, slightly soluble in ethylacetate and soluble in 1-methyl-2-pyrrolidone.

EXAMPLE 3

Synthesis of polyaniline from p-chloroaniline using vanadium (III) chloride in nitrobenzene in the absence of a base.

Para-chloroaniline (5 g, 0.039 moles) was mixed with vanadium (III) chloride (0.2 g, 0.00127 moles) in nitrobenzene (10 ml, 0.098 moles) and heated at reflux with stirring under a nitrogen atmosphere for 6 hours. The solution was allowed to cool to ambient temperature and hexane (50 ml, 0.38 moles) was added to precipitate the product. The solvent was removed by vacuum filtration and the product was further washed with hexane and retained on the filter as a dark purple solid. The product polyaniline (3.5 g) was dried under vacuum. GPC analysis of molecular weight showed $M_n$=1,685 and $M_w$=3,560. The product was found to be insoluble in water and hexane, slightly soluble in ethyl acetate and soluble in 1-methyl-2-pyrrolidone.

COMPARATIVE EXAMPLE 5

Attempted synthesis of polyaniline from p-chloroaniline using cuprous (copper I) chloride in the absence of a solvent and the absence of a base.

In a reactor system like that used in the above examples, a mixture of p-chloroaniline and cuprous chloride was heated to 200° C. As the reaction temperature reached about 80° C., p-chloroaniline was seen to condense and collect at the cooler (upper) part of the reaction vessel. After 4 hours, there was no formation of any reaction products observed. The absence of a solvent prevented retaining the necessary reagents in the reactive interface and prevented the desired polymerization from occurring.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed:

1. A method for producing low molecular weight polyaniline comprising homopolymerizing a para-haloaniline at a temperature in excess of about 180° C. in the presence of a vanadium catalyst and a solvent, thereby to produce polyaniline having a number average molecular weight of from about 300 to about 8,000 and a hydrogen halide.

2. A method as set forth in claim 1, further comprising the additional step of removing the hydrogen halide, thereby producing a neutral polyaniline having a number average molecular weight of from about 300 to about 8,000.

3. A method as set forth in claim 2, wherein said hydrogen halide is removed during the homopolymerization.

4. A method as set forth in claim 2, wherein said hydrogen halide is removed after the homopolymerization.

5. A method as set forth in claim 1, wherein the para-haloaniline is para-bromoaniline or para-chloroaniline.

6. A method as set forth in claim 5, wherein the para-haloaniline is para-chloroaniline.

7. A method as set forth in claim 1, wherein the solvent is an organic solvent that has a normal boiling point above about 180° C. and below the boiling point of para-chloroaniline.

8. A method as set forth in claim 7, wherein the solvent is nitrobenzene.

9. A method as set forth in claim 1, wherein oxygen is excluded from the homopolymerization.

10. A method as set forth in claim 7, wherein the solvent is decahydronaphthalene.

11. A method as set forth in claim 1, wherein the vanadium catalyst comprises a monovalent, divalent, trivalent or tetravalent salt of vanadium.

12. A method as set forth in claim 11, wherein the vanadium catalyst comprises a halide salt of vanadium (II) or vanadium (III).

13. A method as set forth in claim 12, wherein the vanadium catalyst comprises vanadium (II) chloride.

14. A method as set forth in claim 7, wherein the temperature during the homopolymerization is maintained at about the boiling point of the solvent.

15. A method as set forth in claim 3, wherein the hydrogen halide is removed by maintaining the temperature during the homopolymerization sufficiently high to release the halide from the polyaniline and venting hydrogen halide.

16. A method as set forth in claim 1, wherein the low molecular weight polyaniline that is produced has a number average molecular weight between about 500 and about 4,000.

17. A method as set forth in claim 16, wherein the low molecular weight polyaniline that is produced has a number average molecular weight between about 500 and about 1,000 and the organic solvent has a dielectric constant of below about 6.

18. A method as set forth in claim 17, wherein the organic solvent is decahydronaphthalene.

19. A method as set forth in claim 16, wherein the low molecular weight polyaniline that is produced has a number average molecular weight between about 1,000 and 4,000 and the organic solvent has a dielectric constant at least about 30.

20. A method as set forth in claim 19, wherein the organic solvent is nitrobenzene.

21. A method as set forth in claim 16, wherein the low molecular weight polyaniline is insoluble at ambient temperature in water, ethanol, or hexane and is soluble in 1-methyl-2-pyrrolidone, or nitrobenzene.

22. A method for producing low molecular weight neutral polyaniline, comprising homopolymerizing para-chloroaniline at a temperature in excess of about 180° C. in the presence of a catalyst and a solvent, thereby polymerizing the para-chloroaniline to produce polyaniline having a number average molecular weight of from about 300 to about 8,000 and hydrogen chloride; and neutralizing the hydrogen chloride by contacting it with a separable base.

23. A method as set forth in claim 22, wherein the separable base is basic alumina, a molecular sieve, an ion-exchange resin, kaolin clays, or a polymer with amino groups.

24. A method as set forth in claim 22, wherein the separable base is basic alumina.

25. A method as set forth in claim 22, wherein the catalyst comprises a compound of copper, vanadium or palladium.

26. A method as set forth in claim 25, wherein the compound of copper, vanadium or palladium comprises a monovalent, divalent, trivalent or tetravalent salt of copper, vanadium or palladium.

27. A method as set forth in claim 26, wherein the compound of copper, vanadium or palladium is a halide salt of copper (I), vanadium (II) or vanadium (III).

28. A method as set forth in claim 27, wherein the halide salt of copper, vanadium or palladium comprises a halide salt of vanadium.

29. A method as set forth in claim 28, wherein the halide salt of vanadium is vanadium (II) chloride.

* * * * *